(12) United States Patent
Chang et al.

(10) Patent No.: US 11,380,348 B2
(45) Date of Patent: Jul. 5, 2022

(54) METHOD AND SYSTEM FOR CORRECTING INFANT CRYING IDENTIFICATION

(71) Applicant: NATIONAL YUNLIN UNIVERSITY OF SCIENCE AND TECHNOLOGY, Yunlin County (TW)

(72) Inventors: Chuan-Yu Chang, Yunlin County (TW); Jun-Ying Li, Yunlin County (TW)

(73) Assignee: NATIONAL YUNLIN UNIVERSITY OF SCIENCE AND TECHNOLOGY, Yunlin County (TW)

( * ) Notice: Subject to any disclaimer, the term of this patent is extended or adjusted under 35 U.S.C. 154(b) by 107 days.

(21) Appl. No.: 17/004,015

(22) Filed: Aug. 27, 2020

(65) Prior Publication Data

US 2022/0028409 A1    Jan. 27, 2022

(30) Foreign Application Priority Data

Jul. 22, 2020  (TW) .................................. 109124847

(51) Int. Cl.
*H04R 29/00* (2006.01)
*G10L 25/48* (2013.01)
*G10L 25/18* (2013.01)
*G06N 3/04* (2006.01)
*G10L 25/24* (2013.01)
(Continued)

(52) U.S. Cl.
CPC .............. *G10L 25/48* (2013.01); *G06N 3/04* (2013.01); *G06N 3/08* (2013.01); *G10L 25/18* (2013.01); *G10L 25/24* (2013.01); *G10L 25/30* (2013.01)

(58) Field of Classification Search
CPC ...................................................... H04R 29/00
See application file for complete search history.

(56) References Cited

U.S. PATENT DOCUMENTS

2013/0317815 A1* 11/2013 Hong ..................... G10L 25/18
                                                                    704/232
2018/0286414 A1    10/2018 Ravindran et al.
(Continued)

FOREIGN PATENT DOCUMENTS

CN          103280220 A       9/2013
CN          110585649 A      12/2019
(Continued)

*Primary Examiner* — Olisa Anwah
(74) *Attorney, Agent, or Firm* — CKC & Partners Co., LLC

(57) ABSTRACT

A method for correcting infant crying identification includes the following steps: a detecting step provides an audio unit to detect a sound around an infant to generate a plurality of audio samples. A converting step provides a processing unit to convert the audio samples to generate a plurality of audio spectrograms. An extracting step provides a common model to extract the audio spectrograms to generate a plurality of infant crying features. An incremental training step provides an incremental model to train the infant crying features to generate an identification result. A judging step provides the processing unit to judge whether the identification result is correct according to a real result of the infant. When the identification result is different from the real result, an incorrect result is generated. A correcting step provides the processing unit to correct the incremental model according to the incorrect result.

8 Claims, 2 Drawing Sheets

(51) Int. Cl.
  *G06N 3/08*    (2006.01)
  *G10L 25/30*   (2013.01)

(56) References Cited

U.S. PATENT DOCUMENTS

2019/0318755 A1* 10/2019 Tashev ................ G10L 21/0232
2020/0051544 A1*  2/2020 Laput .................. G10L 21/0324
2020/0302949 A1*  9/2020 Jeong ....................... G06N 3/08
2021/0360349 A1* 11/2021 Nyayate ................... H04R 3/04

FOREIGN PATENT DOCUMENTS

TW    201342313 A    10/2013
TW    201349224 A    12/2013

* cited by examiner

METHOD AND SYSTEM FOR CORRECTING INFANT CRYING IDENTIFICATION

RELATED APPLICATIONS

This application claims priority to Taiwan Application Serial Number 109124847, filed Jul. 22, 2020, which is herein incorporated by reference.

BACKGROUND

Technical Field

The present disclosure relates to a method and a system for correcting sound identification. More particularly, the present disclosure relates to a method and a system for correcting infant crying identification with an incremental learning.

Description of Related Art

Before infants learn to speak, they express their physical, psychological, and emotional needs in terms of crying or facial expressions. Therefore, for infants, crying and facial expressions can be regarded as an innate special language. In general, the causes of infant crying are mostly uncomfortable environment, needing to be taken care of or feeding and emotional dependence. When the caregivers or parents look after the infants, they mostly guess the reason behind the infant crying with experience. There is no objective and reliable basis for judgment, especially for novice parents who lack parenting experience, and they often feel helpless when the infant is crying.

In the conventional system for crying identification, because of the difference in infant growth and environmental factors, the identification result of the infant differs from the real result of the infant. When the conventional system for crying identification is used by the caregiver in the actual environment, the training samples for crying are usually impossible to get all at once, and the information reflected by the training samples can also change over time. When the traditional method with machine learning encounters newly added training samples, the traditional method with machine learning usually needs to retrain the entire data, which can easily cause catastrophic forgetting effects.

Therefore, how to improve the application of machine learning to the system for sound identification, make the system avoid catastrophic forgetting effects and reduce the time for re-training and identification to train personalized models become the goal of relevant industry efforts.

SUMMARY

According to an embodiment of a methodical aspect of the present disclosure, a method for correcting infant crying identification is for identifying a crying of an infant and includes a detecting step, a converting step, an extracting step, an incremental training step, a judging step and a correcting step. The detecting step provides an audio unit to detect a sound around the infant to generate a plurality of audio samples. The converting step provides a processing unit to convert the audio samples to generate a plurality of audio spectrograms. The extracting step provides a common model to extract the audio spectrograms to generate a plurality of infant crying features. The incremental training step provides an incremental model to train the infant crying features to generate an identification result. The judging step provides the processing unit to judge whether the identification result is correct according to a real result of the infant. When the identification result is different from the real result, an incorrect result is generated. The correcting step provides the processing unit to correct the incremental model according to the incorrect result.

According to an embodiment of a structural aspect of the present disclosure, a system for correcting infant crying identification is for identifying a crying of an infant. The system for correcting infant crying identification includes an audio unit and a processing module. The audio unit detects a sound around the infant to generate a plurality of audio samples. The processing module is electrically connected to the audio unit and includes a memory and a processing unit. The memory includes a real result, a common model and an incremental model. The real result is corresponding to the crying of the infant. The common model is created from the audio samples. The incremental model is created from a plurality of infant crying features. The processing unit is connected to the audio unit and the memory and receives the audio samples. The processing unit converts the audio samples to generate a plurality of audio spectrograms. The processing unit extracts the audio spectrograms through the common model to generate a plurality of infant crying features. The processing unit trains the infant crying features through the incremental model to generate an identification result and judges whether the identification result is correct according to the real result. When the identification result is different from the real result, the processing unit generates an incorrect result and corrects the incremental model according to the incorrect result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
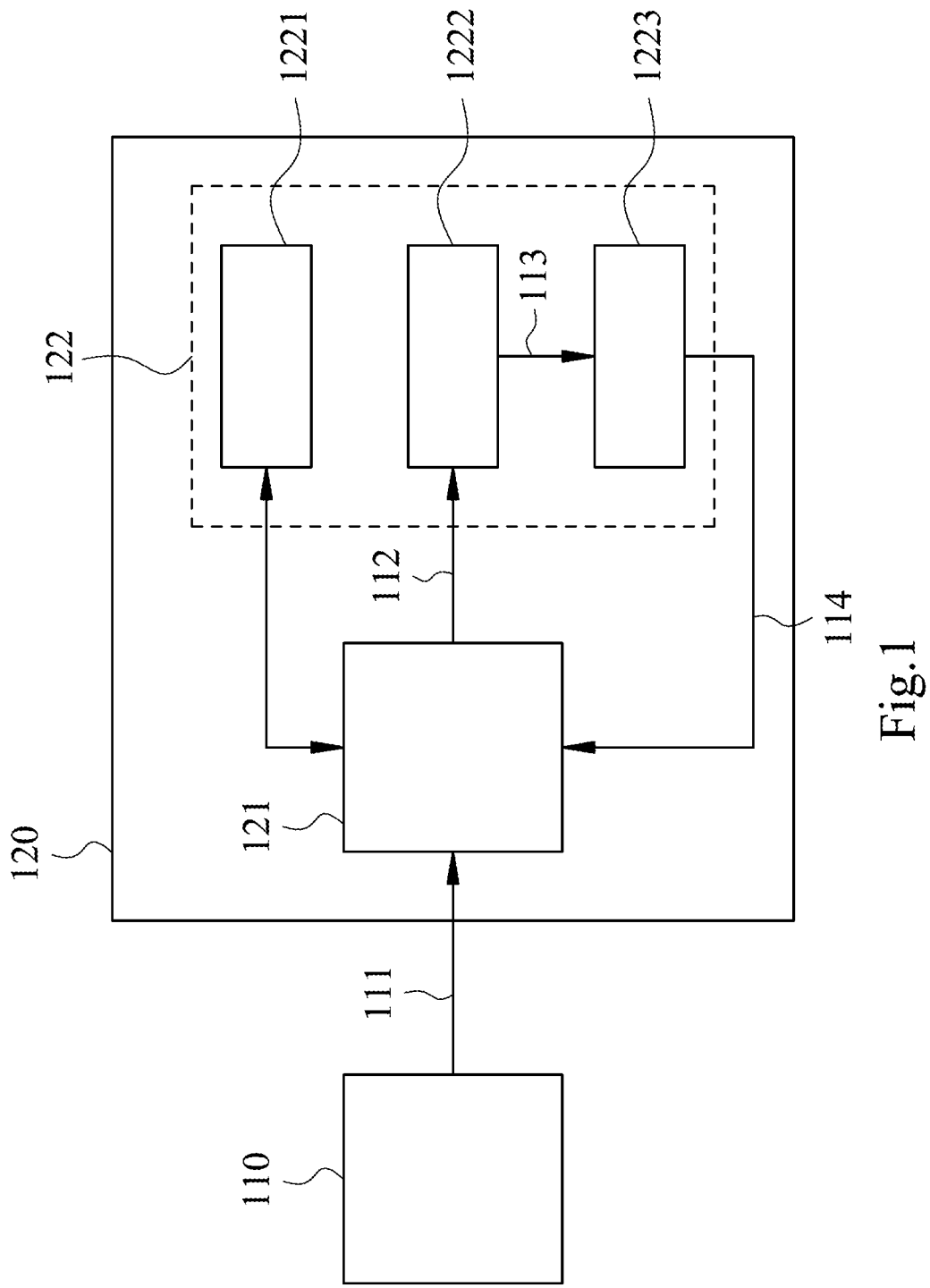
FIG. 1 is a block diagram of a system for correcting infant crying identification according to an embodiment of a structural aspect of the present disclosure.

FIG. 1 is a block diagram of a system 100 for correcting infant crying identification according to an embodiment of a structural aspect of the present disclosure. In FIG. 1, the system 100 for correcting infant crying identification is for identifying a crying of an infant. The system 100 for correcting infant crying identification includes an audio unit 110 and a processing module 120. In the embodiment, the audio unit 110 can be a recording device, and the processing module 120 can be a computer, but the present disclosure is not limited thereto.

The audio unit 110 detects a sound around the infant to generate a plurality of audio samples 111. The processing module 120 is electrically connected to the audio unit 110 and includes a processing unit 121 and a memory 122. The memory 122 includes a real result 1221, a common model 1222 and an incremental model 1223. The real result 1221 is corresponding to the crying of the infant.

The processing unit 121 is connected to the audio unit 110 and the memory 122 and receives the audio samples 111. The processing unit 121 converts the audio samples 111 to generate a plurality of audio spectrograms 112. The processing unit 121 extracts the audio spectrograms 112 through the common model 1222 to generate a plurality of infant crying features 113. The common model 1222 is created in advance from the first one of the audio samples 111, and the incremental model 1223 is created in advance from the first one of the infant crying features 113. The training of the above models is a conventional art and is not the focus of the present disclosure, and will not be detailedly described herein. The processing unit 121 trains the infant crying features 113 through the incremental model 1223 to generate an identification result 114 and judges whether the identification result 114 is correct according to the real result 1221. Particularly, when the identification result 114 is the same as the real result 1221, the processing unit 121 generates a correct result (not shown), and the correct result represents the cause of infant crying. More particularly, when the identification result 114 is different from the real result 1221, the processing unit 121 generates an incorrect result (not shown) and then corrects the incremental model 1223 according to the incorrect result.

Therefore, the incremental model 1223 can be gradually updated with adding different infant crying features 113, so that the incremental model 1223 need not to learn all the audio samples 111 again.

Figure 2:
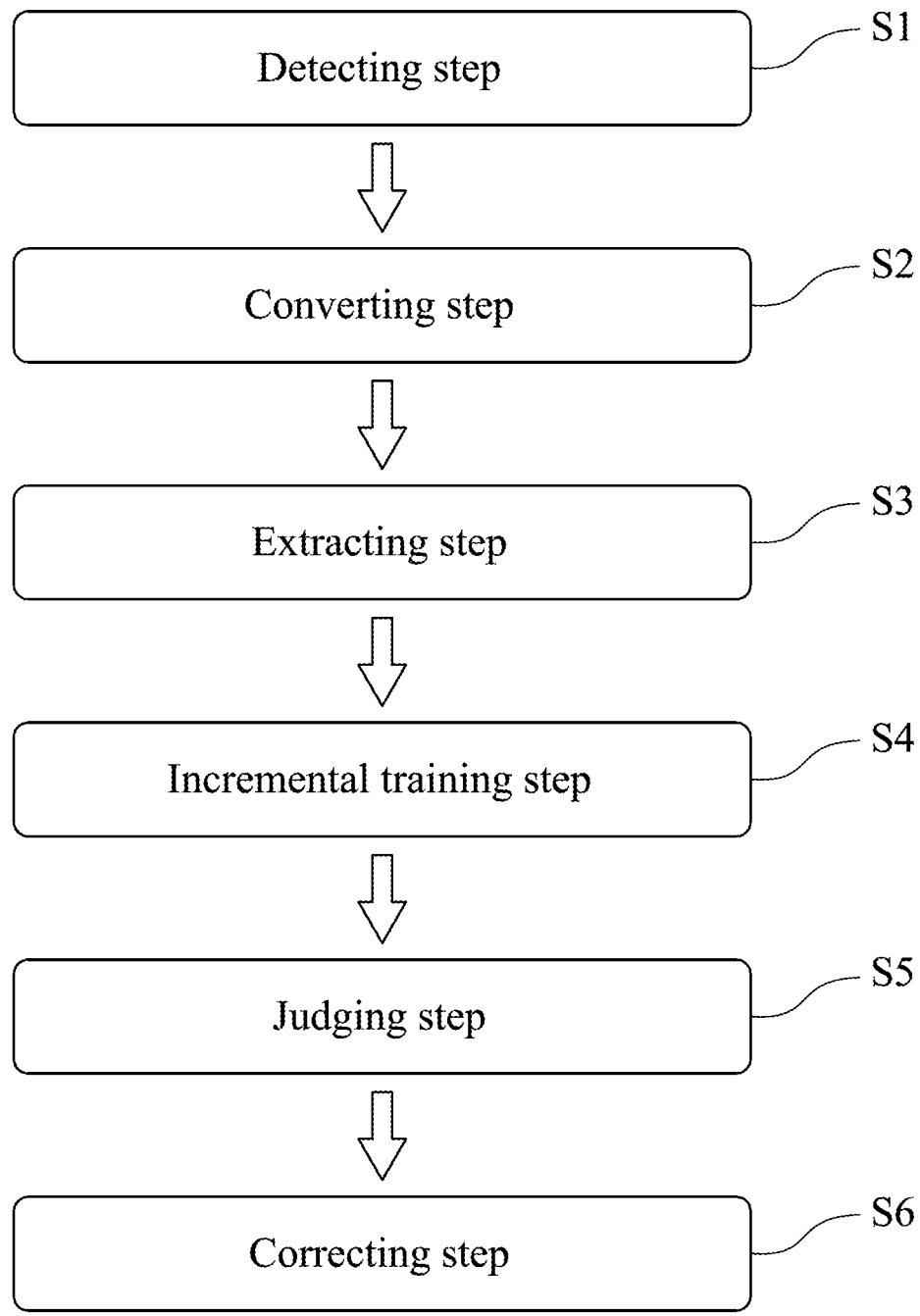
FIG. 2 is a flow chart of a method for correcting infant crying identification according to an embodiment of a methodical aspect of the present disclosure.

Please refer to FIGS. 1 and 2. FIG. 2 is a flow chart of a method 200 for correcting infant crying identification according to an embodiment of a methodical aspect of the present disclosure. In FIG. 2, the method 200 for correcting infant crying identification can be applied to the system 100 for correcting infant crying identification in FIG. 1. The method 200 for correcting infant crying identification is for identifying the crying of the infant and includes a detecting step S1, a converting step S2, an extracting step S3, an incremental training step S4, a judging step S5 and a correcting step S6.

The detecting step S1 provides the audio unit 110 to detect the sound around the infant to generate the audio samples 111. The converting step S2 provides the processing unit 121 to convert the audio samples 111 to generate the audio spectrograms 112. The extracting step S3 provides the common model 1222 to extract the audio spectrograms 112 to generate the infant crying features 113. The incremental training step S4 provides the incremental model 1223 to train the infant crying features 113 to generate the identification result 114. The judging step S5 provides the processing unit 121 to judge whether the identification result 114 is correct according to the real result 1221 of the infant. Especially, when the identification result 114 is the same as the real result 1221, the processing unit 121 generates a correct result (not shown), the correct result represents the cause of infant crying, and the correcting step S6 will not be executed. More especially, when the identification result 144 is different from the real result 1221, the incorrect result is generated. The correcting step S6 is executed and provides the processing unit 121 to correct the incremental model 1223 according to the incorrect result. Furthermore, an execution order of the steps of the method 200 for correcting infant crying identification is the detecting step S1, the converting step S2, the extracting step S3, the incremental training step S4, the judging step S5 and the correcting step S6.

Therefore, the infant crying feature 113 can be identified through the incremental model 1223. When the identification result 114 is different from the real result 1221, the method 200 for correcting infant crying identification can correct the previous incremental model 1223 so as to generate a crying identification model exclusively for each of the infants.

In detail, as the infant grows and changes in the environment, the identification result 114 is easily to be different from the real result 1221. For example, when the identification result 114 indicates that the infant crying is that the infant is frightened, but the actual situation is that the infant is not fed, the processing unit 121 judges that the identification result 114 and the actual situation are different according the real result 1221. Therefore, during the next identification, the incremental model 1223 is corrected and updated at the same time. Especially, the method 200 for correcting infant crying identification can adjust a cumulative number (not shown) of the incorrect results to correct the incremental model 1223. In the method 200 for correcting infant crying identification, the judging step S5 is performed to set the cumulative number of the incorrect results to 0. In response to the identification result 114 is different from the real result 1221, the cumulative number is accumulated. In response to the cumulative number is between 5 and 10, the correcting step S6 is executed.

Furthermore, in the converting step S2, the processing unit 121 can convert audio samples 111 through a Fast Fourier Transform (FFT) to generate the audio spectrograms 112, and each of the audio spectrograms is a Mel-spectrogram. In the processing of signals, the Mel-spectrogram is a spectrogram that can be used to represent a short-term audio. FFT and the Mel-spectrogram are both conventional arts and not the focus of the present disclosure, and will not be detailedly described herein.

Moreover, in the extracting step S3, the common model 1222 is a convolutional neural network (CNN). It is worth noting that when each of the audio samples 111 is an infant crying sample, the processing unit 121 trains the infant crying samples to generate the common model 1222, so that the processing unit 121 extracts the audio spectrograms 112 according to the common model 1222 to generate the infant crying features 113. In detail, the audio spectrograms 112 can be any kind of sound spectrogram. Therefore, the common model 1222 is pre-trained from the processing unit 121 for extracting the sound spectrograms of the infant crying in the audio spectrograms 112, so that the incremental model 1223 receives the marked crying samples (that is, the infant crying features 113).

Moreover, in the incremental training step S4, the incremental model 1223 is a bidirectional recurrent neural network (BRNN). The incremental model 1223 is based on an algorithm of an incremental learning to gradually update parameters of a model and can correct and strengthen the parameters, so that the updated parameters can adapt to the added data and do not need to relearn all the data. Therefore, the incremental model 1223 reduces the demand for time and space and can more satisfy the actual requirements so as to avoid the problem of the catastrophic forgetting effects.

In summary, the present disclosure has the following advantages: First, it is favorable for greatly reducing the time for retraining and identification. Second, it is favorable for the previous incremental model to be corrected and updated so as to generate the crying identification model exclusively for each of the infants.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for correcting infant crying identification, which is for identifying a crying of an infant, the method for correcting infant crying identification comprising:
   a detecting step providing an audio unit to detect a sound around the infant to generate a plurality of audio samples;
   a converting step providing a processing unit to convert the audio samples to generate a plurality of audio spectrograms;
   an extracting step providing a common model to extract the audio spectrograms to generate a plurality of infant crying features;
   an incremental training step providing an incremental model to train the infant crying features to generate an identification result;
   a judging step providing the processing unit to judge whether the identification result is correct according to a real result of the infant, wherein in response to the identification result is different from the real result, an incorrect result is generated; and
   a correcting step providing the processing unit to correct the incremental model according to the incorrect result;
   wherein the judging step comprises,
      setting a cumulative number of the incorrect results to 0;
      in response to the identification result is different from the real result, the cumulative number is accumulated; and
      in response to the cumulative number is between 5 and 10, the correcting step is executed.

2. The method for correcting infant crying identification of claim 1, wherein in response to each of the audio samples is an infant crying sample, the processing unit trains the infant crying samples to generate the common model, so that the processing unit extracts the infant crying features through the common model.

3. The method for correcting infant crying identification of claim 1, wherein the common model is a convolutional neural network (CNN).

4. The method for correcting infant crying identification of claim 1, wherein the incremental model is a bidirectional recurrent neural network (BRNN).

5. The method for correcting infant crying identification of claim 1, wherein each of the audio spectrograms is a Mel-spectrogram.

6. The method for correcting infant crying identification of claim 1, wherein an execution order of the steps is the detecting step, the converting step, the extracting step, the incremental training step, the judging step and the correcting step.

7. A system for correcting infant crying identification, which is for identifying a crying of an infant, the system for correcting infant crying identification comprising:
   an audio unit detecting a sound around the infant to generate a plurality of audio samples; and
   a processing module electrically connected to the audio unit, wherein the processing module comprises:
      a memory, comprising:
         a real result corresponding to the crying of the infant;
         a common model created from the audio samples; and
         an incremental model created from a plurality of infant crying features; and
      a processing unit connected to the audio unit and the memory and receiving the audio samples, wherein the processing unit converts the audio samples to generate a plurality of audio spectrograms, the processing unit extracts the audio spectrograms through the common model to generate a plurality of infant crying features, the processing unit trains the infant crying features through the incremental model to generate an identification result, and the processing unit judges whether the identification result is correct according to the real result;
   wherein in response to the identification result is different from the real result, the processing unit generates an incorrect result, and the processing unit corrects the incremental model according to the incorrect result;
   wherein,
      a cumulative number of the incorrect results is set to 0;
      in response to the identification result is different from the real result, the cumulative number is accumulated; and
      in response to the cumulative number is between 5 and 10, the correcting step is executed.

8. The system for correcting infant crying identification of claim 7, wherein in response to each of the audio samples is an infant crying sample, the processing unit trains the infant crying samples to generate the common model, so that the processing unit extracts the infant crying features through the common model.

* * * * *